United States Patent
Hayashibe et al.

(10) Patent No.: US 7,212,559 B2
(45) Date of Patent: May 1, 2007

(54) OPTICAL RESONATOR AND LASER OSCILLATOR

(75) Inventors: Kazuya Hayashibe, Kanagawa (JP); Masayuki Morita, Saitama (JP); Tatsuo Fukui, Kanagawa (JP); Yutaka Imai, Tokyo (JP)

(73) Assignee: Sony Corporation (JP)

( * ) Notice: Subject to any disclaimer, the term of this patent is extended or adjusted under 35 U.S.C. 154(b) by 292 days.

(21) Appl. No.: 10/787,078

(22) Filed: Feb. 27, 2004

(65) Prior Publication Data

US 2004/0190579 A1 Sep. 30, 2004

(30) Foreign Application Priority Data

Mar. 26, 2003 (JP) ............................ P2003-086028

(51) Int. Cl.
*H01S 3/08* (2006.01)
(52) U.S. Cl. ..................... 372/92; 372/50.1; 372/43.01
(58) Field of Classification Search ................. 372/92, 372/99, 43.01, 50.1
See application file for complete search history.

(56) References Cited

U.S. PATENT DOCUMENTS

| | | | |
|---|---|---|---|
| 5,293,038 A * | 3/1994 | Kadowaki et al. .......... 250/216 |
| 2004/0161193 A1* | 8/2004 | Yee .............................. 385/31 |
| 2004/0190579 A1* | 9/2004 | Hayashibe et al. ........... 372/92 |

* cited by examiner

Primary Examiner—Minsun Oh Harvey
Assistant Examiner—Delma R. Flores Ruiz
(74) Attorney, Agent, or Firm—Rader Fishman & Grauer PLLC; Ronald P. Kananen

(57) ABSTRACT

An optical resonator includes a first substrate and a second substrate which face each other, the first substrate having a flat main surface on which a first reflective mirror is provided and the second substrate having a concave portion on which a second reflective mirror is provided and a flat portion which surrounds the concave portion. The main surface of the first substrate and the flat portion of the second substrate are bondable. In addition, a laser oscillator includes a solid-state laser medium and a substrate, the solid-state laser medium having a main surface on which a first reflective mirror is provided and the substrate having a concave portion on which a second mirror is provided and a flat portion which surrounds the concave portion. The first and the second reflective mirrors serve as a laser resonator.

7 Claims, 3 Drawing Sheets

OPTICAL RESONATOR AND LASER OSCILLATOR

BACKGROUND OF THE INVENTION

1. Field of the Invention

The present invention relates to an optical resonator and a laser oscillator including a solid-state laser medium and a laser resonator and is suitably applied to a microchip laser.

2. Description of the Related Art

Recently, an excitation method for solid-state lasers using a semiconductor laser has been developed, and the size of the solid-state lasers has been reduced and the efficiency and life thereof have been increased compared to the case where a discharge tube is used for excitation.

In particular, microchip lasers having a thin solid-state laser medium have been developed as small laser oscillators for achieving low-order, longitudinal-mode oscillation and obtaining beams of a desirable shape (refer to, for example, "The Review of Laser Engineering", Vol. 26 (1998), p. 848 written by Takunori Taira).

Generally, laser resonators included in the microchip lasers are plane-parallel laser resonators obtained by grinding the solid-state laser medium to reduce the thickness thereof and forming mirror surfaces on both sides of the solid-state laser medium.

However, the plane-parallel laser resonators are basically unstable, and the degree of parallelism between the mirror surfaces, that is, the degree of parallelism between the surfaces of the crystal of the solid-state laser medium, must be as high as possible in order to achieve the laser oscillation.

In addition, in the plane-parallel laser resonators, the laser oscillation is achieved using a thermal lens effect in which the reflective index of the solid-state laser medium varies in correspondence with the temperature distribution caused by focusing excitation light on the solid-state laser medium.

However, even if the thermal lens effect is enhanced by increasing the excitation intensity and the laser beam is converged so that the degree of parallelism in the laser resonator can be increased enough to achieve the laser oscillation, the beam shape is distorted when the mirror surfaces of the resonator are even slightly inclined.

In addition, if the excitation intensity is low, the thermal lens effect reduces and a sufficient degree of parallelism cannot be obtained. Therefore, stable laser oscillation cannot be achieved.

Accordingly, in order to achieve stable laser oscillation, laser resonators having a concave mirror may be used. In such a laser resonator, the concave mirror is provided as one of the mirrors forming the laser resonator.

For example, a first main surface of the crystal of a thin solid-state laser medium serves as a flat mirror and a second main surface transmits resonating light. Thus, the light passes through the second main surface and resonates on the concave mirror.

However, when the concave mirror is simply disposed by itself, the central region of the concave mirror is farther away from the flat mirror compared to the peripheral region thereof and the number of components for positioning the concave mirror and the solid-state laser medium increases. Therefore, the cavity length increases accordingly.

Preferably, the concave mirror and the solid-state laser medium can be aligned easily.

SUMMARY OF THE INVENTION

In view of the above-described problems, the present invention provides an optical resonator which has a short cavity length and which can be used as a stable laser resonator. In addition, the present invention also provides a small laser oscillator having a simple structure which includes a stable laser resonator.

An optical resonator according to the present invention includes a first substrate and a second substrate which face each other, the first substrate having a flat main surface on the side facing the second substrate and the second substrate having a concave portion and a flat portion surrounding the concave portion on the side facing the first substrate; a first reflective mirror provided on the main surface of the first substrate; and a second reflective mirror provide at least on the surface of the concave portion; and the main surface of the first substrate and the flat portion of the second substrate are bondable to each other.

A laser oscillator according to the present invention includes a solid-state laser medium; a substrate which is bonded to the solid-state laser medium and which has a concave portion and a flat portion surrounding the concave portion on the side facing the solid-state laser medium; a first reflective mirror provided on or adjacent to a main surface of the solid-state laser medium on the side opposite to the substrate; and a second reflective mirror provided at least on the surface of the concave portion of the substrate, and the first and the second reflective mirrors serve as a laser resonator.

According to the optical resonator of the present invention, the second substrate has the concave portion and the flat portion surrounding the concave portion on the side facing the first substrate, and the second reflective mirror is provided on the surface of the concave portion. Therefore, the second reflective mirror provided on the concave portion of the second substrate serves as a concave mirror and the alignment of the second reflective mirror with respect of the optical path of resonating light can be easily performed.

Since the second substrate has the concave portion and the flat portion on the side on which the second reflective mirror is provided, the depth of the concave portion can be reduced compared to the case where the concave portion extends over the entire region of the second substrate.

In addition, since the flat potion of the second substrate and the main surface of the first substrate on which the first reflective mirror is provided are bondable, the first substrate and the second substrate can be fixed together. In such a case, the distance between the first reflective mirror and the second reflective mirror can be reduced.

According to the laser oscillator of the present invention, the substrate has the concave portion and the flat portion surrounding the concave portion on the side facing the solid-state laser medium, and the second reflective mirror is provided on the surface of the concave portion. Therefore, the second reflective mirror serves as a concave mirror and the alignment of the second reflective mirror with respect of the optical path of resonating light can be easily performed.

Since the substrate has the concave portion and the flat portion on the side on which the second reflective mirror is provided, the depth of the concave portion can be reduced compared to the case where the concave portion extends over the entire region of the main surface of the substrate. In addition, since the first reflective mirror and the second reflective mirror serve as the laser resonator, the distance between the first reflective mirror and the second reflective mirror can be reduced and the cavity length of the laser resonator can be reduced accordingly. Furthermore, the cavity length can be set to a desired value by suitably setting the radius of curvature and the diameter of the concave portion.

According to the optical resonator of the present invention, the alignment of the reflective mirrors can be easily performed and the cavity length can be reduced.

In addition, according to the laser oscillator of the present invention, the alignment of the solid-state laser medium and the reflective mirrors forming the laser resonator can be performed easily. In addition, the laser resonator can be manufactured such that defects in the solid-state laser medium are excluded.

In addition, the cavity length, which is the main parameter of a microchip laser, can be easily reduced and be set to a desired value, and single-longitudinal-mode oscillation can be achieved easily by reducing the cavity length.

Accordingly, a small microchip laser with high beam quality can be obtained.

DESCRIPTION OF THE PREFERRED EMBODIMENTS

According to the present invention, an optical resonator includes a first substrate and a second substrate which face each other, the first substrate having a flat main surface on the side facing the second substrate and the second substrate having a concave portion and a flat portion surrounding the concave portion on the side facing the first substrate; a first reflective mirror provided on the main surface of the first substrate; and a second reflective mirror provide at least on the surface of the concave portion, and the main surface of the first substrate and the flat portion of the second substrate are bondable.

In addition, according to the present invention, a laser oscillator includes a solid-state laser medium; a substrate which is bonded to the solid-state laser medium and which has a concave portion and a flat portion surrounding the concave portion on the side facing the solid-state laser medium; a first reflective mirror provided on or adjacent to a main surface of the solid-state laser medium on the side opposite to the substrate; and a second reflective mirror provided at least on the surface of the concave portion of the substrate, and the first and the second reflective mirrors serve as a laser resonator.

In the laser oscillator according to the present invention, the first reflective mirror may be provided on the main surface of the solid-state laser medium.

In addition, in the laser oscillator according to the present invention, the first reflective mirror may be provided on another substrate that is bonded to the main surface of the solid-state laser medium.

In addition, in the laser oscillator according to the present invention, the free spectral range $\Delta\lambda_{FSR}$ of the laser resonator is preferably larger than the half-width at half-maximum $\Delta\lambda$ of the emission spectrum of the solid-state laser medium.

The construction of an optical resonator according to the present invention will be described below with reference to FIGS. 3A and 3B.

Figure 3A:
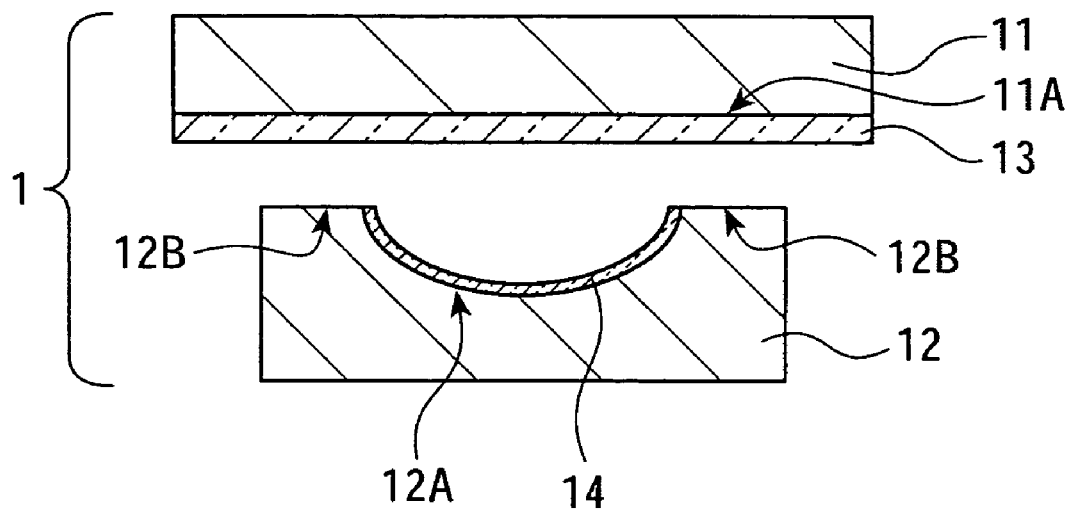
FIGS. 3A and 3B are diagrams showing an optical resonator according to the present invention.
Figure 3B:
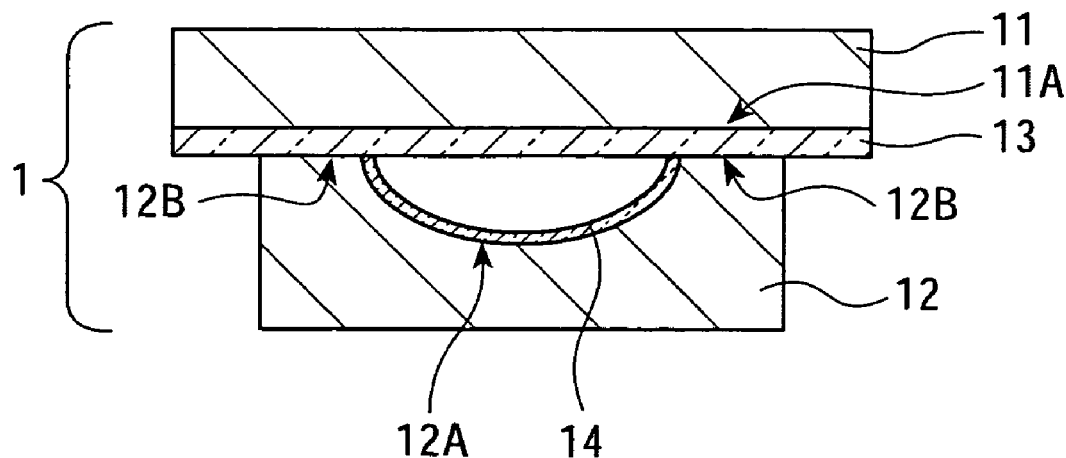

FIGS. 3A and 3B show the schematic construction of the optical resonator, and no laser medium is shown in the figures.

As shown in FIG. 3A, an optical resonator 1 is composed of a first substrate 11 and a second substrate 12.

The first substrate 11 is ground to have a flat main surface 11A on one side, and a reflective mirror 13 is provided on the main surface 11A.

The second substrate 12 has a concave portion 12A in one of the main surfaces at the central region thereof and a flat portion 12B at the periphery of the concave portion 12A. A reflective mirror 14 is provided on the surface of the concave portion 12A, and thus a concave mirror is obtained.

The optical resonator 1 is constructed by arranging the first substrate 11 and the second substrate 12 such that the main surface of the first substrate 11 on which the reflective mirror 13 is provided and the main surface of the second substrate 12 on which the reflective mirror 14 is provided face each other.

In the optical resonator 1, the first substrate 11 on which the reflective mirror 13 is provided and the flat portion 12B of the second substrate 12 can be bonded to each other, as shown in FIG. 3B.

In this case, the cavity length of the optical resonator 1 can be reduced.

In particular, since the concave portion 12A is provided only at the central region of the second substrate 12 where light resonates and the flat portion 12B is provided at the periphery of the concave portion 12A, the cavity length, that is, the distance between the reflective mirrors 13 and 14, can be reduced compared to the case where the concave portion extends over the entire region of the main surface of the second substrate 12. In addition, a desired cavity length can be obtained by suitably setting the radius of curvature and the diameter of the concave portion 12A.

The first substrate 11 and the second substrate 12 may be composed of, for example, glass materials such as BK7 and synthetic quartz, which are generally used for forming optical lenses, crystal materials such as $CaF_2$, $SiO_2$, and a sapphire substrate, etc.

The reflective mirrors 13 and 14 may be composed of a dielectric film, a metal film, etc., and their film structure is set such that a desired reflective index can be obtained. The reflective mirror 13 provided on the first substrate 11 is composed of a dielectric laminate film of $SiO_2$, $TiO_2$, $MgF_2$, $Ta_2O_5$, etc., so that a part of the light passes therethrough and a laser beam is emitted.

The radius of curvature and the diameter of the concave portion 12A of the second substrate 12 are set in accordance with the desired cavity length of the optical resonator 1 and the diameter of a light beam to be captured in the optical resonator 1.

When, for example, the radius of curvature R and the diameter of the concave portion 12A are set to 100 mm and 10 mm, respectively, the cavity length in the state in which the first substrate 11 and the second substrate 12 are bonded together, as shown in FIG. 3B, is about 125 μm.

In the above-described construction of the optical resonator 1, the reflective mirror 14 is a concave mirror. Therefore, compared to an optical resonator composed of two plane-parallel mirrors, the alignment between the reflective mirrors 13 and 14 forming the optical resonator 1 and the alignment with respect to the optical path of the light beam to be captured can be easily performed.

In the optical resonator 1, the reflective mirror 14 has a point where the normal of the reflective mirror 13 on the first substrate 11 perpendicularly intersects the reflective mirror 14.

Therefore, the optical resonator 1 in which light reliably resonates can be obtained simply by bonding the first substrate 11 and the second substrate 12 together, as shown in FIG. 3B.

In order to form a laser oscillator, a laser medium must be disposed between the two substrates 11 and 12 of the optical resonator 1.

Therefore, the laser medium and the optical resonator 1 must be assembled together by, for example, bonding the substrates 11 and 12 with the laser medium interposed therebetween or attaching the laser medium to one of the substrates 11 and 12 before they are bonded together.

Next, a laser oscillator according to an embodiment of the invention which incorporates the construction of the above-described optical resonator 1 will be described below.

Figure 1:
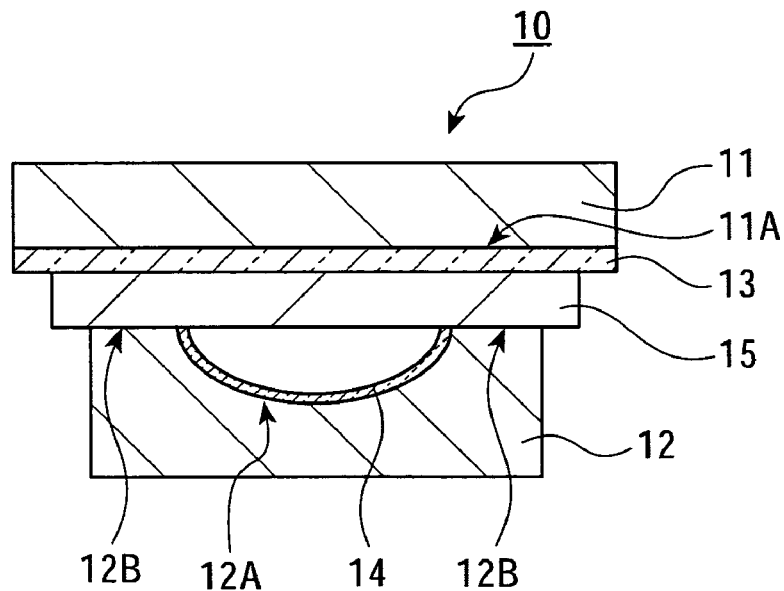
FIG. 1 is a schematic diagram showing a laser oscillator according to an embodiment of the present invention.

FIG. 1 is a schematic diagram showing a laser oscillator 10 according to the embodiment of the present invention.

The laser oscillator 10 includes a first substrate 11 and a second substrate 12 similar to those shown in FIGS. 3A and 3B and a solid-state laser medium 15 disposed between the first substrate 11 and the second substrate 12. The first substrate 11, the solid-state laser medium 15, and the second substrate 12 are bonded together.

The first substrate 11 is ground to have a flat main surface 11A on one side, and a reflective mirror 13 is provided on the main surface 11A. In addition, the second substrate 12 has a concave portion 12A in one of the main surfaces at the central region thereof and a flat portion 12B at the periphery of the concave portion 12A. A reflective mirror 14 is provided on the surface of the concave portion 12A, and thus a concave mirror is obtained.

The solid-state laser medium 15 is ground to have a thin, plate shape, and single-longitudinal-mode oscillation can be achieved by the solid-state laser medium 15.

As described above, the first substrate 11 and the second substrate 12 may be composed of, for example, glass materials such as BK7 and synthetic quartz, which are generally used for forming optical lenses, crystal materials such as $CaF_2$, $SiO_2$, and a sapphire substrate, etc.

The reflective mirrors 13 and 14 may be composed of a dielectric film, a metal film, etc., and their film structure is set such that the desired reflective index can be obtained.

In addition, the radius of curvature and the diameter of the concave portion 12A of the second substrate 12 are set in accordance with a desired cavity length of the optical resonator 1 and the diameter of a light beam to be captured in the optical resonator 1.

The solid-state laser medium 15 may be composed of, for example, solid-state laser crystals such as Nd:YAG ($Y_3Al_5O_{12}$), Nd:YVO$_4$, Nd:GdVO$_4$, and Nd:YLF (YLiF$_4$), glass laser media such as Nd-doped glass, etc.

The radius of curvature and the diameter of the concave portion 12A of the second substrate 12 and the thickness of the solid-state laser medium 15 are set in accordance with the desired cavity length.

The optical path length L and the free spectral range (FSR), i.e., the longitudinal mode interval $\Delta\lambda_{FSR}$ of the laser resonator, satisfy the following equation:

$$\Delta\lambda_{FSR} = \lambda^2/2L \quad (1)$$

where $\lambda$ is the wavelength of light which resonates in the laser resonator. For example, the wavelength is 1064 nm in a Nd:YAG laser.

Accordingly, when L is 1 mm, the longitudinal mode interval $\Delta\lambda_{FSR}$ is 0.57 nm.

Generally, single-longitudinal-mode oscillation can be achieved when the longitudinal mode interval $\Delta\lambda_{FSR}$ is more than about one-fifth and less than several times the width of the emission spectrum obtained by the solid-state laser medium 15.

More preferably, the longitudinal mode interval $\Delta\lambda_{FSR}$ is larger than the half-width at half-maximum $\Delta\lambda$ of the emission spectrum obtained by the solid-state laser medium 15. In such a case, the longitudinal-mode oscillation can be achieved easily.

Therefore, the cavity length is determined so as to satisfy this conduction, and the radius of curvature and the diameter of the concave portion 12A of the second substrate 12 and the thickness of the solid-state laser medium 15 are set in accordance with the determined cavity length.

The width of the emission spectrum of the Nd:YAG laser is reported to be 0.67 nm in the above-mentioned reference, and therefore the single-longitudinal-mode oscillation can be achieved when the optical path length L is 1 mm. In addition, the single-longitudinal-mode oscillation can be more easily achieved when the cavity length is reduced and the longitudinal mode interval is increased.

For example, when the solid-state laser medium 15 is composed of Nd:YVO$_4$ and is ground such that the thickness thereof is reduced to 200 μm and the radius of curvature R and the diameter of the concave portion 12A of the second substrate 12 are set to 100 mm and 10 mm, respectively, the optical path length of the resonator is about 550 μm, taking the reflective index of the crystal of the solid-state laser medium 15 into account. In this case, the longitudinal mode interval is 1.04 nm. The width of the emission spectrum of the Nd:YVO$_4$ laser is reported to be 0.96 nm in the above-mentioned reference, and therefore the longitudinal mode interval can be set larger than the width of the emission spectrum width.

Accordingly, the single-longitudinal-mode oscillation can be achieved easily.

When the laser oscillator 10 according to the present embodiment is assembled, the thin solid-state laser medium 15 is bonded to both the first substrate 11 and the second substrate 12.

The solid-state laser medium 15 can be bonded to the first substrate 11 and the second substrate 12 with, for example, a transparent adhesive. The transparent adhesive may be, for example, an adhesive composed of an ultraviolet curable resin, a so-called optical adhesive, etc.

More specifically, for example, one of the main surfaces of the solid-state laser medium 15 is bonded to the reflective mirror 13 provided on the first substrate 11 with the transparent adhesive, and then the other main surface of the solid-state laser medium 15 is bonded to the main surface of the second substrate 12 on which the concave mirror is provided with the transparent adhesive.

Both of the main surfaces of the solid-state laser medium 15 may be ground before the solid-state laser medium 15 is bonded to the reflective mirror 13 provided on the first substrate 11. Alternatively, one of the main surfaces of the solid-state laser medium 15 may be ground first before it is bonded to the reflective mirror 13 provided on the first substrate 11, and the other main surface may be ground while the solid-state laser medium 15 is fixed to the reflective mirror 13 provided on the first substrate 11 before it is bonded to the second substrate 12.

Since the solid-state laser medium 15 may have defects, the solid-state laser medium 15 is preferably bonded to the second substrate 12 such that the defects are excluded.

For this purpose, a method described below, for example, may be used.

Figure 4A:
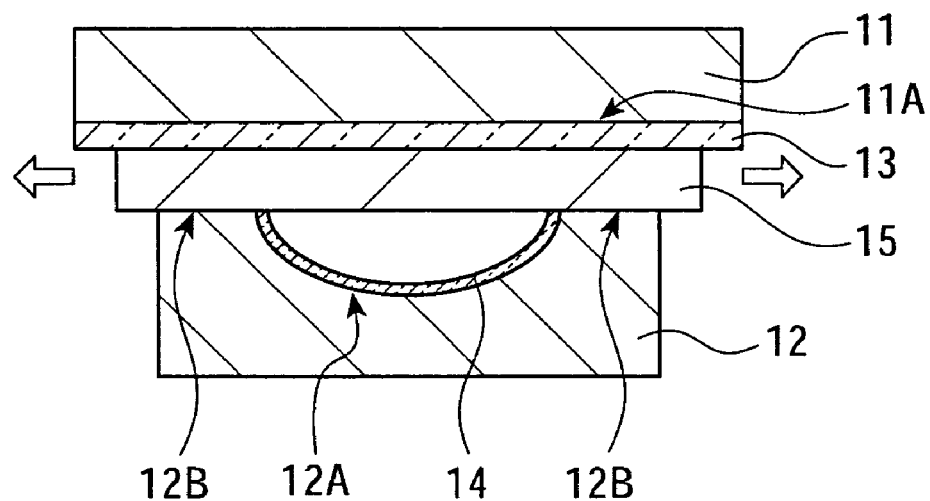
FIG. 4A is a diagram showing the manner in which a solid-state laser medium is moved along a second substrate.

Before the solid-state laser medium 15 and the second substrate 12 are bonded together with an adhesive, the solid-state laser medium 15 and the second substrate 12 are brought into contact with each other such that the solid-state laser medium 15 can slide along the second substrate 12. In this state, excitation light from an excitation light source is guided into the solid-state laser medium 15 so that a laser beam is emitted therefrom. It is determined whether or not the laser beam passes through the defects in the solid-state laser medium 15 by monitoring the emitted laser beam. Accordingly, the defects can be excluded by moving the solid-state laser medium 15 along the second substrate 12, as shown in FIG. 4A.

Therefore, the resonator can be bonded to the solid-state laser medium 15 at a position where the number of defects is small.

Figure 4B:
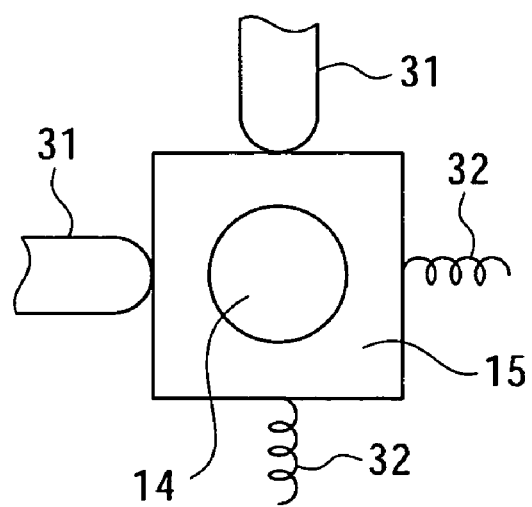
FIG. 4B is a schematic plan view of a jig used for moving the solid-state laser medium.

In the above-described process, the jig shown in FIG. 4B, for example, may be used.

The jig includes two actuators, one having a projection 31 and an elastic member 32 which are in contact with the left and the right sides of the solid-state laser medium 15 in the figure and the other having a projection 31 and an elastic member 32 which are in contact with the top and the bottom sides of the solid-state laser medium 15 in the figure. The second substrate 12 is fixed with fixing means (not shown) in such a manner that the solid-state laser medium 15 can slide along the second substrate 12.

The solid-state laser medium 15 is moved, as shown in FIG. 4A, by driving the actuators while monitoring the state of the output laser beam, so that the laser beam can pass through the solid-state laser medium 15 in a region free from defects and resonate on the concave mirror 14. The movement of the solid-state laser medium 15 is stopped at the position where the optical path along which the laser beam passes to resonate is in a region free from defects in the solid-state laser medium 15, and the solid-state laser medium 15 is bonded to the second substrate 12 at that position.

Next, the optical path in the case in which the ground solid-state laser medium 15 has a low degree of parallelism and is wedge-shaped.

The solid-state laser medium 15 is often formed into a wedge shape when one of the main surfaces of the solid-state laser medium 15 is bonded to the first substrate 11 in an inclined manner due to thickness variation of the adhesive and the other main surface of the solid-state laser medium 15, which is to be bonded to the second substrate 12, is ground in that state.

In order for the light to resonate in the resonator, the light must be perpendicularly incident on the reflective mirrors forming the resonator. The light is reflected by the reflective mirror 13 provided on the first substrate 11, passes through the solid-state laser medium 15, and reaches the main surface of the solid-state laser medium 15 on the other side. At this time, if the solid-state laser medium 15 is wedge-shaped, the light is incident on the main surface of the solid-state laser medium 15 at an angle and is, therefore, refracted by this surface.

Therefore, when the other one of the reflective mirrors forming the resonator is a flat mirror, that is, when the resonator is a plane-parallel resonator, an alignment for making the refracted light perpendicularly incident on the reflective mirror must be performed to achieve the laser oscillation, and such an alignment is difficult.

In comparison, when the other one of the reflective mirrors is a concave mirror as in the present embodiment, the concave mirror 14 has a point where the refracted light is perpendicularly incident on the concave mirror 14. Therefore, the resonator structure can be obtained simply by bonding the second substrate 12, which has the concave mirror 14 provided on the concave portion 12A at the central region thereof, to the solid-state laser medium 15.

In addition, since the concave mirror 14 is used, the beam shape can be improved compared to the case where a parallel mirror is used. Accordingly, the quality of both the longitudinal and transverse mode oscillations can be improved.

In addition, the cavity length can be controlled by adjusting the radius of curvature and the diameter of the concave portion 12A when the concave portion 12A is formed and adjusting the thickness of the solid-state laser medium 15 in the grinding process. Accordingly, the cavity length, which is the main parameter of a microchip laser, can be set to a desired value.

In addition, in the microchip laser, the gain at the resonance wavelength changes due to a slight change in the cavity length, such as a change in the order of wavelength, and the output changes accordingly.

In order to solve this problem, the cavity length may be adjusted to a desired value by adjusting the temperature of the resonator and causing expansion or contraction of the resonator.

In addition, the excitation position of the resonator can be finely changed by changing the position at which the excitation light is incident on the solid-state laser medium 15, and thus the cavity length can be finely changed since the concave surface of the concave mirror 14 is inclined. Accordingly, the cavity length can be set to a value at which the gain at the resonance wavelength is maximum.

In the laser oscillator 10 according to the present embodiment, the second substrate 12 has a concave portion 12A in one of the main surfaces at the central region thereof, and the concave mirror 14 provided on the surface of the concave portion 12A serves as one of the reflective mirrors of the laser resonator included in the laser oscillator 10. Therefore, even when the laser beam from the solid-state laser medium 15 is incident on the second substrate 12 at an angle, the reflective mirror 14 has a point where the incident light is perpendicular to the surface thereof. Thus, the laser resonator can be constructed and the laser oscillation can be achieved.

Accordingly, compared to the case where the main surface of the second substrate 12 is entirely flat, that is, the case where the resonator is a plane-parallel resonator, the alignment between the solid-state laser medium 15 and the second substrate 12 can be performed easily.

In addition, since the concave portion 12A is provided only at the central region of the main surface of the second substrate 12 and the flat portion 12B is provided at the periphery of the concave portion 12A, the depth of the concave portion 12A is relatively small even when the concave portion 12A has a large curvature. In addition, since the flat portion 12B is provided, the solid-state laser medium 15 can be easily bonded to the flat portion 12B.

Accordingly, compared to the case where the concave portion extends over the entire region of the main surface of the second substrate 12, the distance from the bonding surface between the solid-state laser medium 15 and the second substrate 12 to the concave mirror 14 can be reduced and a laser oscillator having a laser resonator with a short cavity length can be obtained.

In addition, the cavity length, which is the main parameter of a microchip laser, can be set to a desired value by adjusting the radius of curvature and the diameter of the concave portion 12A and the thickness of the solid-state laser medium 15.

In addition, since the laser resonator can be constructed such that the defects in the solid-state laser medium 15 are excluded when the solid-state laser medium 15 and the second substrate 12 are aligned with each other, a laser oscillator in which the laser beam passes through the solid-state laser medium 15 in a region free from the defects and which can reliably achieve laser oscillation can be manufactured easily.

Accordingly, a small microchip laser which outputs a laser beam having a desirable shape can be manufactured by a simple process.

In the laser oscillator according to the above-described embodiment which is shown in FIG. 1, the reflective mirror 13 is provided on the first substrate 11. However, the reflective mirror 13 also may be provided on the solid-state laser medium 15. This case will be described below.

Figure 2:
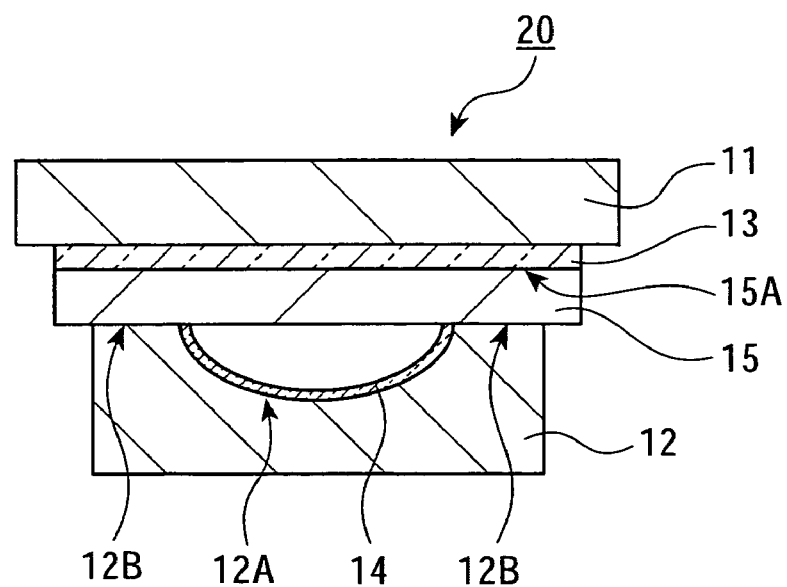
FIG. 2 is a schematic diagram showing a laser oscillator according to another embodiment of the present invention.

FIG. 2 is a schematic diagram showing a laser oscillator 20 according to another embodiment of the present invention.

In the laser oscillator 20, a reflective mirror 13 is provided on a main surface 15A of a solid-state laser medium 15 on the side facing a first substrate 11, and the first substrate 11 is ground to have a flat surface and is bonded to the reflective mirror 13 provided on the solid-state laser medium 15.

Also, in this case, the reflective mirror 13 may be composed of a dielectric laminate film of $SiO_2$, $TiO_2$, $MgF_2$, $Ta_2O_5$, etc.

Other constructions of the present embodiment are similar to the laser oscillator 10 according to the first embodiment, which is shown in FIG. 1. Therefore, components similar to those of the laser oscillator 10 are denoted by the same reference numerals and explanations thereof are omitted.

According to the present embodiment, the reflective mirror 13 is provided on the solid-state laser medium 15. Therefore, the first substrate 11 may be omitted if the solid-state laser medium 15 has sufficient rigidity.

According to the laser oscillator 20 of the present embodiment, similar to the laser oscillator 10 of the first embodiment, the alignment between the solid-state laser medium 15 and the second substrate 12 can be performed easily and a laser oscillator having a laser resonator with a short cavity length can be obtained.

In addition, the cavity length can be set to a desired value and a laser oscillator in which the laser beam passes through the solid-state laser medium 15 in a region free from defects and which can reliably achieve laser oscillation can be manufactured easily.

Accordingly, a small microchip laser which outputs a laser beam having a desirable shape can be manufactured by a simple process.

In addition, in the laser oscillators according to the above-described embodiments, the first substrate 11 is plate-shaped and the solid-state laser medium 15 is bonded to one of the main surfaces of the first substrate 11. However, the construction of the first substrate according to the present invention is not limited to this.

In the present invention, the reflective mirrors used in the optical resonator or the laser resonator included in the laser oscillator are not limited to dielectric films, and a semiconductor Bragg reflective mirror or a saturable-absorber mirror also may be used.

The present invention is not limited to the above-described embodiments, and various modifications are possible within the scope of the present invention.

The invention claimed is:

1. A laser oscillator comprising:
a solid-state laser medium for producing an emission spectrum having a width;
a substrate which is bonded to the solid-state laser medium and which has a concave portion and a flat portion surrounding the concave portion on the side facing the solid-state laser medium;
a first reflective mirror provided on or adjacent to a main surface of the solid-state laser medium on the side opposite to the substrate; and
a second reflective mirror provided at least on the surface of the concave portion of the substrate,
wherein the first and the second reflective mirrors serve as a laser resonator, and
wherein single-longitudinal-mode oscillation is achieved when the longitudinal mode interval is more than about one-fifth and less than several times the width of the emission spectrum obtained by the solid-state laser medium.

2. A laser oscillator according to claim 1, wherein the first reflective mirror is provided on the main surface of the solid-state laser medium.

3. A laser oscillator according to claim 1, wherein the first reflective mirror is provided on another substrate which is bonded to the main surface of the solid-state laser medium.

4. A laser oscillator comprising:
a solid-state laser medium;
a substrate which is bonded to the solid-state laser medium and which has a concave portion and a flat portion surrounding the concave portion on the side facing the solid-state laser medium;
a first reflective mirror provided on or adjacent to a main surface of the solid-state laser medium on the side opposite to the substrate; and
a second reflective mirror provided at least on the surface of the concave portion of the substrate,
wherein the first and the second reflective mirrors serve as a laser resonator,
wherein the free spectral range $\Delta\lambda_{FSR}$ of the laser resonator is larger than the half-width at half-maximum $\Delta\lambda$ of the emission spectrum of the solid-state laser medium.

5. A laser oscillator according to claim 4, wherein the first reflective mirror is provided on the main surface of the solid-state laser medium.

6. A laser oscillator according to claim 4, wherein the first reflective mirror is provided on another substrate which is bonded to the main surface of the solid-state laser medium.

7. The laser oscillator as set forth in claim 1, wherein an optical path L and a free spectral range of said laser oscillator provide a longitudinal mode interval of the laser resonator that is equal to a square of the wavelength of light which resonates in the laser resonator divided by twice the optical path length L.

* * * * *